US009957917B2

(12) United States Patent
Cawthorne et al.

(10) Patent No.: US 9,957,917 B2
(45) Date of Patent: May 1, 2018

(54) VARIABLE AREA NOZZLE AND ASSOCIATED PROPULSION SYSTEM AND METHOD

(71) Applicant: The Boeing Company, Chicago, IL (US)

(72) Inventors: Matthew H. Cawthorne, Newtown Square, PA (US); Evan J. Filter, Doylestown, PA (US)

(73) Assignee: The Boeing Company, Chicago, IL (US)

( * ) Notice: Subject to any disclaimer, the term of this patent is extended or adjusted under 35 U.S.C. 154(b) by 808 days.

(21) Appl. No.: 14/455,063

(22) Filed: Aug. 8, 2014

(65) Prior Publication Data

US 2016/0040625 A1    Feb. 11, 2016

(51) Int. Cl.
 F02K 1/10    (2006.01)
 F02K 1/00    (2006.01)
 F01D 17/16    (2006.01)

(52) U.S. Cl.
 CPC ............... F02K 1/10 (2013.01); F01D 17/16 (2013.01); F02K 1/008 (2013.01); F05D 2250/121 (2013.01); F05D 2250/141 (2013.01); F05D 2250/42 (2013.01); F05D 2250/90 (2013.01); F05D 2260/52 (2013.01); F05D 2300/501 (2013.01); Y02T 50/672 (2013.01)

(58) Field of Classification Search
 CPC ... F02K 3/06; F02K 3/075; F02K 1/70; F02K 1/72; Y02T 50/671
 See application file for complete search history.

(56) References Cited

U.S. PATENT DOCUMENTS

| | | | |
|---|---|---|---|
| 3,316,716 A | 5/1967 | Escher | |
| 3,612,403 A | 10/1971 | Baghdadi | |
| 4,176,792 A | 12/1979 | McCardle, Jr. | |
| 5,927,647 A * | 7/1999 | Masters | F02K 1/72 239/265.19 |
| 6,276,126 B1 | 8/2001 | Bouiller | |
| 7,093,423 B2 * | 8/2006 | Gowda, Sr. | F02K 1/48 239/265.43 |
| 7,340,883 B2 | 3/2008 | Wood et al. | |
| 7,926,285 B2 | 4/2011 | Tisdale et al. | |
| 8,397,485 B2 | 3/2013 | Wood et al. | |
| 8,590,842 B2 | 11/2013 | Dos Santos e Lucato et al. | |
| 2006/0101803 A1* | 5/2006 | White | F02K 1/386 60/204 |
| 2008/0092518 A1 | 4/2008 | Winkler et al. | |
| 2008/0120979 A1 | 5/2008 | Wood et al. | |
| 2008/0163606 A1* | 7/2008 | Cini | F02K 1/09 60/204 |
| 2009/0178410 A1* | 7/2009 | Straza | B29D 99/0089 60/725 |

(Continued)

FOREIGN PATENT DOCUMENTS

EP    1 944 496 A2    7/2008
JP    H02 131161    10/1990

OTHER PUBLICATIONS

Extended European Search Report, EP 15 17 5415 (dated 2016).

Primary Examiner — Craig Kim
(74) Attorney, Agent, or Firm — Walters & Wasylyna

(57) ABSTRACT

A nozzle including a frame having a plurality of deflecting elements arranged in an array, the array extending about a longitudinal axis, and a skin positioned over the frame.

20 Claims, 8 Drawing Sheets

(56) References Cited

U.S. PATENT DOCUMENTS

2011/0147533 A1 6/2011 Goossen et al.
2013/0227952 A1* 9/2013 Grip .......................... B64C 1/12
60/770

* cited by examiner

VARIABLE AREA NOZZLE AND ASSOCIATED PROPULSION SYSTEM AND METHOD

GOVERNMENT RIGHTS

This invention was made with government support under contract number HR0011-14-9-0002 awarded by the Defense Advanced Research Projects Agency. The government has certain rights in this invention.

FIELD

This application relates to nozzles and, more particularly, to exhaust nozzles for propulsion systems.

BACKGROUND

Propulsion units, such as ducted fans and jet engines, typically include a nozzle on the exhaust end thereof that receives a flow of fluid (e.g., air and/or exhaust gases). Such nozzles enhance propulsion by constricting or diffusing fluid flow. The characteristics of the resulting fluid jet, such as pressure, velocity and direction, may be a function of the overall shape of the nozzle, as well as the cross-sectional area of the throat of the nozzle.

In a variable area nozzle, the cross-sectional area of the throat of the nozzle may be varied in real time. For example, depending on operating conditions at a given time, the cross-sectional area of the throat may be increased (diverged) or decreased (converged). Such real-time control of the nozzle may enhance propulsion performance and overall operating efficiency.

A typical variable area fan nozzle is constructed from a series of overlapping pedals that may reduce the cross-sectional area of the throat of the nozzle. A series of actuators is required to manipulate the pedals as desired. The actuators and associated hardware used to couple the actuators to the pedals add complexity and significantly increase the overall weight of the nozzle.

Accordingly, those skilled in the art continue with research and development efforts in the field of nozzles.

SUMMARY

In one embodiment, the disclosed nozzle may include a frame having a plurality of deflecting elements arranged in an array, the array extending about a longitudinal axis, and a skin positioned over the frame.

In another embodiment, the disclosed propulsion system may include a nozzle and a propulsion unit having an inlet end opposed from an outlet end along a longitudinal axis, wherein the nozzle is connected to the outlet end of the propulsion unit, and wherein the nozzle defines a throat having a cross-sectional area, the nozzle including a frame having a plurality of deflecting elements arranged in a tubular array and a skin positioned over the frame.

In another embodiment, the disclosed propulsion system may include a nozzle and a propulsion unit having an inlet end opposed from an outlet end along a longitudinal axis, wherein the nozzle is connected to the inlet end of the propulsion unit, and wherein the nozzle defines a throat having a cross-sectional area, the nozzle including a frame having a plurality of deflecting elements arranged in a tubular array and a skin positioned over the frame.

In another embodiment, the disclosed propulsion system may include a propulsion unit having an inlet end opposed from an outlet end along a longitudinal axis and a nozzle having an inlet end and an outlet end, wherein the inlet end of the nozzle is connected to the outlet end of the propulsion unit to align the nozzle with the propulsion unit along the longitudinal axis, and wherein the outlet end of the nozzle defines a throat having a cross-sectional area, the nozzle including a frame having a plurality of interconnected deflecting elements arranged in a tubular array, a skin positioned over the frame, and an actuation assembly operatively connected to the frame to selectively apply to the frame a substantially longitudinal deflection force, thereby causing a corresponding change in the cross-sectional area of the throat of the nozzle.

In another embodiment, the disclosed propulsion system may include a propulsion unit having an inlet end opposed from an outlet end along a longitudinal axis and a nozzle having an inlet end and an outlet end, wherein the outlet end of the nozzle is connected to the inlet end of the propulsion unit to align the nozzle with the propulsion unit along the longitudinal axis, and wherein the inlet end of the nozzle defines a throat having a cross-sectional area, the nozzle including a frame having a plurality of interconnected deflecting elements arranged in a tubular array, a skin positioned over the frame, and an actuation assembly operatively connected to the frame to selectively apply to the frame a substantially longitudinal deflection force, thereby causing a corresponding change in the cross-sectional area of the throat of the nozzle.

In yet another embodiment, the disclosed nozzle method may include the steps of (1) providing a nozzle having a frame including a plurality of deflecting elements arranged in an array, the array extending about a longitudinal axis; and (2) applying a deflection force to the frame, wherein the deflection force is applied in a direction substantially parallel with the longitudinal axis.

Other embodiments of the disclosed variable area nozzle and associated propulsion system and method will become apparent from the following detailed description, the accompanying drawings and the appended claims.

DETAILED DESCRIPTION

Figure 1:
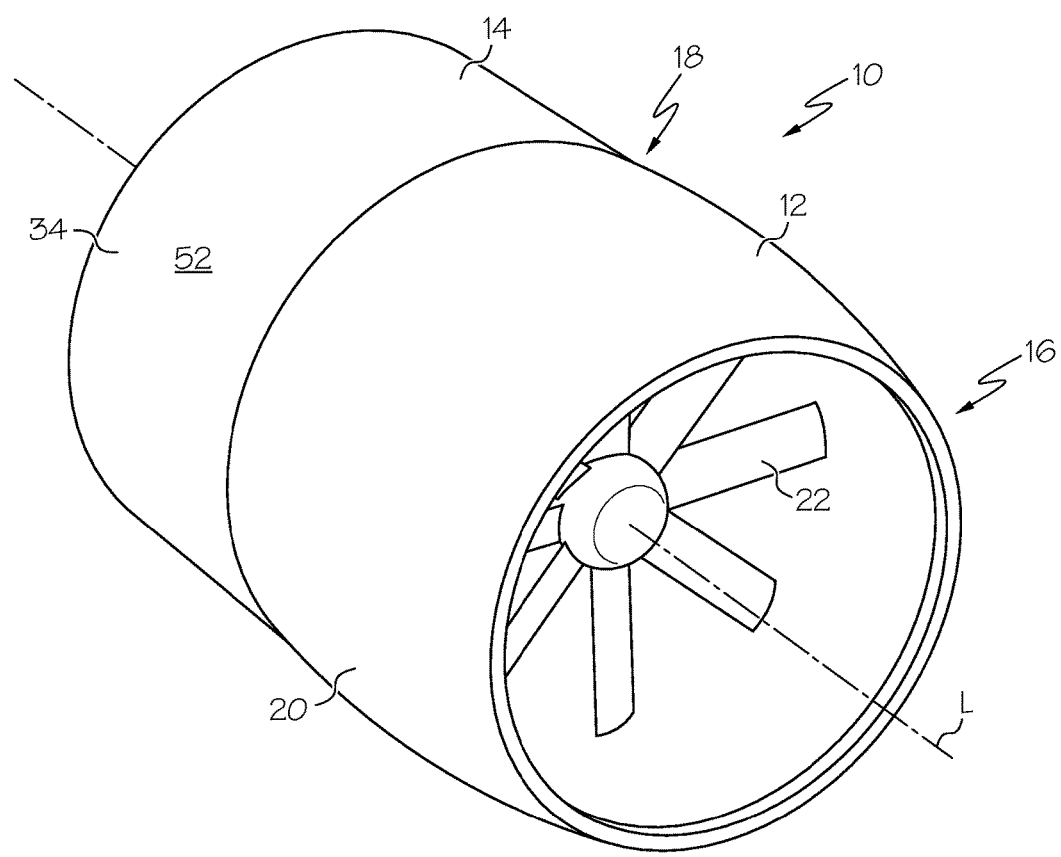
FIG. 1 is a front perspective view of one embodiment of the disclosed propulsion system.

Referring to FIG. 1, one embodiment of the disclosed propulsion system, generally designated 10, may include a propulsion unit 12 and a nozzle 14. The propulsion unit 12 may include an inlet end 16 and an outlet end 18. The nozzle 14 may be an exhaust nozzle connected to the propulsion unit 12 proximate (at or near) the outlet end 18 such that the nozzle 14 is substantially aligned with the propulsion unit 12 along a longitudinal axis L. Alternatively, the nozzle 14 may be an inlet nozzle connected to the propulsion unit 12 proximate the inlet end 18 such that the nozzle 14 is substantially aligned with the propulsion unit 12 along the longitudinal axis L.

The propulsion unit 12 of the propulsion system 10 may be any apparatus or system capable of moving a fluid from the inlet end 16 to the outlet end 18 along the longitudinal axis L. In the illustrated embodiment, the propulsion unit 12 may be a ducted fan that includes a duct 20 and a fan 22 closely received within the duct 20. The fan 22 may be electrically powered, and may move ambient air through the propulsion unit 12. In one variation, the propulsion unit 12 may be a combustion-powered propulsion unit, such as a jet engine, a turbofan engine, a pump jet, a rocket engine, and may move a fluid (e.g., combustion gases; ambient air; water; etc.) through the propulsion unit 12. Various other propulsion units 12 may be used without departing from the scope of the present disclosure.

The propulsion unit 12 may be connected to a vehicle (not shown) to propel the vehicle. In one expression, the propulsion unit 12 may be connected to an aerial vehicle, such as an airplane, a rotorcraft, a drone or the like. In another expression, the propulsion unit 12 may be connected to a ground-based vehicle, such as a wheeled vehicle (e.g., an automobile) or the like. In yet another expression, the propulsion unit 12 may be connected to a watercraft, such as a hovercraft, a boat, a personal watercraft or the like. None-vehicle applications for the propulsion unit 12, such as a wind tunnel application, are also contemplated.

Figure 2:
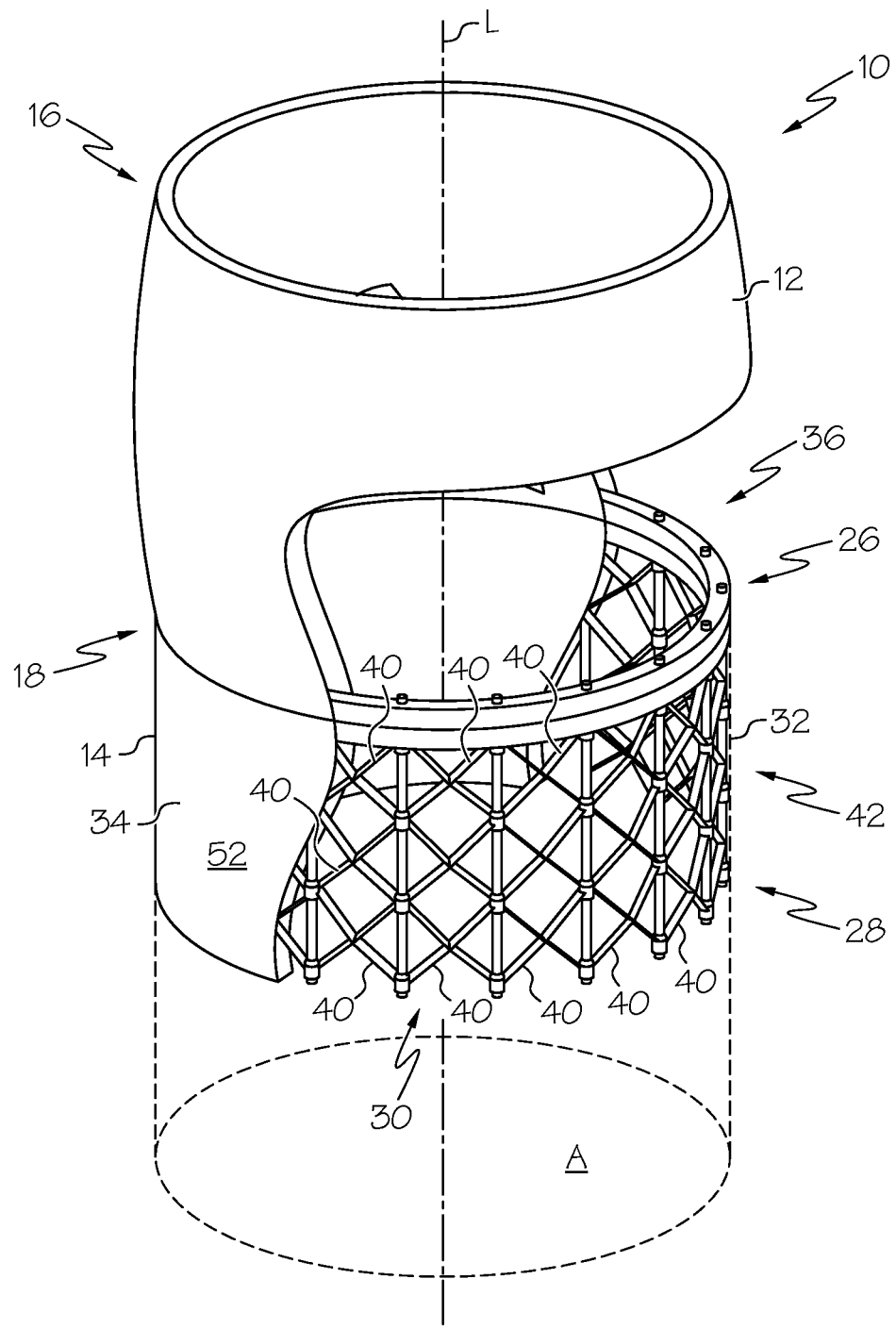
FIG. 2 is a perspective view of the propulsion system of FIG. 1 with a portion thereof cut-away to show the structure of the nozzle.

Referring to FIG. 2, the nozzle 14 of the propulsion system 10 may be a generally tubular (but not necessarily cylindrical) structure having an inlet end 26 and an outlet end 28. In the case of an exhaust nozzle (shown in FIGS. 1 and 2), the inlet end 26 of the nozzle 14 may be connected to the outlet end 18 of the propulsion unit 12 (e.g., with mechanical fasteners) such that the nozzle 14 is fluidly coupled with the propulsion unit 12 and substantially aligned with the propulsion unit 12 along the longitudinal axis L. Alternatively, in the case of an inlet nozzle, the outlet end 28 of the nozzle 14 may be connected to the inlet end 16 of the propulsion unit 12 such that the nozzle 14 is fluidly coupled with the propulsion unit 12 and substantially aligned with the propulsion unit 12 along the longitudinal axis L.

In the case of an exhaust nozzle (shown in FIGS. 1 and 2), the outlet end 28 of the nozzle 14 may define a throat 30. The throat 30 may have a cross-sectional area A, which is shown in FIG. 2 projected onto a plane that is perpendicular to the longitudinal axis L. The cross-sectional area A of the throat 30 of the nozzle 14 may be varied (e.g., increased or decreased), as described in greater detail herein. Therefore, fluid entering the propulsion system 10 by way of the inlet end 16 of the propulsion unit 12 may exit the propulsion system 10 by way of the throat 30 and the flow characteristics (e.g., pressure; flow rate; direction) of the exiting fluid may be varied by varying the cross-sectional area A of the throat 30. Alternatively, in the case of an inlet nozzle, the inlet end 26 of the nozzle 14 may define the throat 30.

The nozzle 14 may include a frame 32, a skin 34 and an actuation assembly 36. The skin 34 may be received over the frame 32 and the actuation assembly 36 may be operatively connected to the frame 32. As described in greater detail herein, actuation of the actuation assembly 36 may effect a corresponding change in the cross-sectional area A of the throat 30 of the nozzle 14.

The frame 32 of the nozzle 14 may include a plurality of deflecting elements 40 arranged in an array 42. Each deflecting element 40 in the array 42 may be connected (e.g., at a node 44 (FIG. 3A)) to the adjacent deflecting elements 40 within the array 42 (e.g., to deflecting elements 40 that are longitudinally above and below, and laterally to the left and right). The array 42 of interconnected deflecting elements 40 may circumferentially extend about the longitudinal axis L (e.g., the array 42 may be a tubular array), thereby forming the tubular structure of the nozzle 14.

Figure 3A:
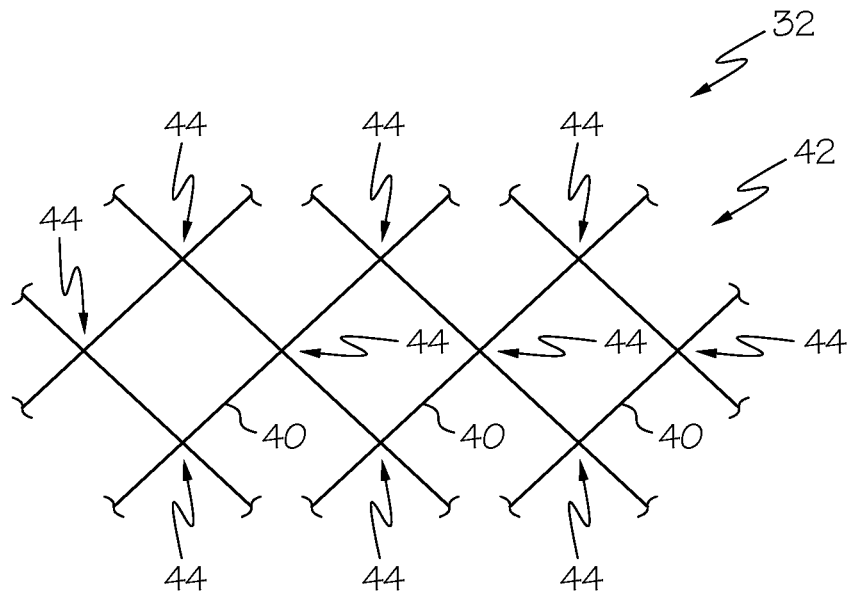
FIG. 3A is an elevational view of a portion of the frame of the nozzle of the propulsion system of FIG. 2, wherein the deflecting elements are shown in an uncompressed state.
Figure 3B:
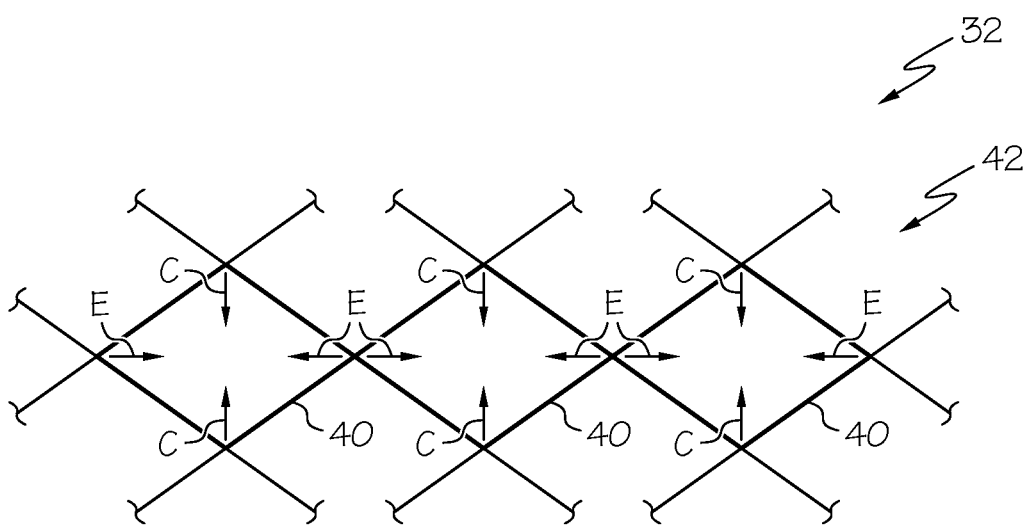
FIG. 3B is an elevational view of the portion of the frame shown in FIG. 3A, but in a compressed state with corresponding lateral expansion.

The deflecting elements 40 of the frame 32 of the nozzle 14 may be deflected in a direction substantially parallel with the longitudinal axis L to produce a displacement substantially perpendicular to the longitudinal axis L. For example, as shown in FIGS. 3A and 3B, when a longitudinal compression (deflection) force (see arrows C in FIG. 3B) is applied to the deflecting elements 40, a corresponding lateral expansion (see arrows E in FIG. 3B) may be effected. Similarly, while not shown, when a longitudinal pulling (deflection) force is applied to the deflecting elements 40 (opposite of arrow C in FIG. 3B), a corresponding lateral contraction may be effected (opposite of arrow E in FIG. 3B).

Figure 4A:
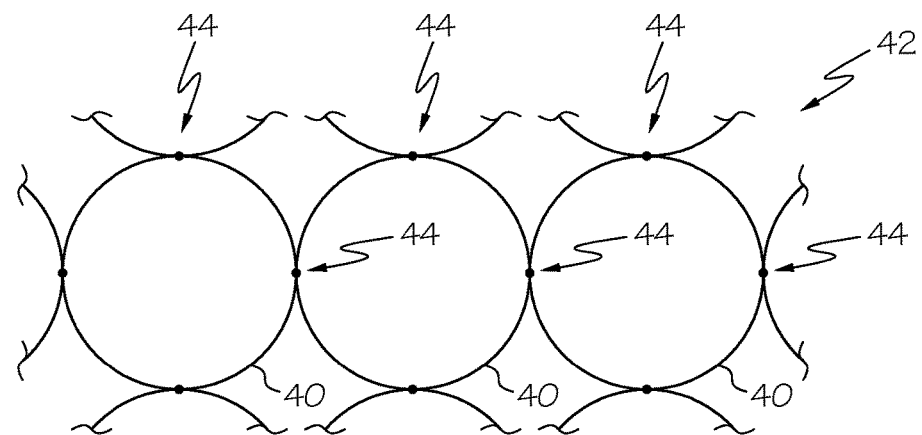
FIG. 4A is an elevational view of a portion of the frame in accordance with one alternative embodiment, wherein the deflecting elements are shown in an uncompressed state.
Figure 4B:
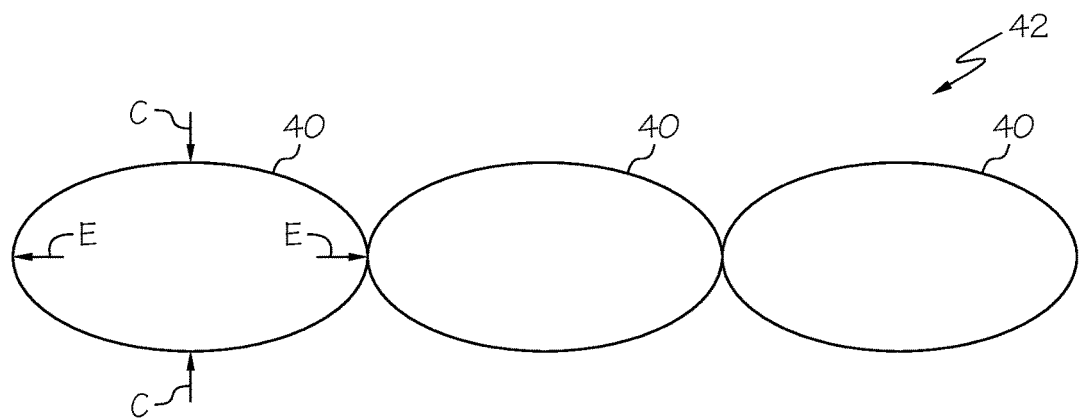
FIG. 4B is an elevational view of the portion of the frame shown in FIG. 4A, but in a compressed state with corresponding lateral expansion.

As shown in FIGS. 2 and 3A, the deflecting elements 40 of the frame 32 of the nozzle 14 may have a square (or lozenge) frame structure, which may readily facilitate interconnecting (e.g., at vertices 44) the deflecting elements 40 into the tubular array 42. However, various deflecting element geometries (e.g., rectilinear; curvilinear; elliptical; irregular; etc.) may be used without departing from the scope of the present disclosure. For example, as shown in FIGS. 4A and 4B, deflecting elements 40 having a circular frame structure may be interconnected (e.g., at vertices 44) to form a tubular array 42 capable of laterally expanding (arrows E in FIG. 4B) in response to longitudinal compression (arrows C in FIG. 4B).

To accommodate repeated deflection, the deflecting elements 40 of the frame 32 of the nozzle 14 may be formed from a material capable of retaining the overall shape of the nozzle 14, but that is sufficiently flexible yet resilient such that the frame 32 is capable of repeatedly responding to the deflection forces applied by the actuation assembly 36. As one specific, non-limiting example, the deflecting elements 40 may be formed from (or may include) a metal, such as steel (e.g., stainless steel) or titanium alloy (e.g., nitinol). As another specific, non-limiting example, the deflecting elements 40 may be formed from (or may include) a polymeric material (e.g., natural or synthetic rubber). As yet another specific, non-limiting example, the deflecting elements 40 may be formed from (or may include) a fiberous material (e.g., fiberglass or carbon). Various materials (including combinations of materials) may be used without departing from the scope of the present disclosure.

While the deflecting elements 40 of the frame 32 of the nozzle 14 are shown in FIGS. 2, 3A, 3B, 4A and 4B as having a continuous frame structure that provides spring-back, springiness of the deflecting elements 40 may be achieved using various techniques. For example, rather than each deflecting element 40 having a continuous frame structure, a deflecting element 40 may be formed from two or more pieces that have been connected together to form the deflecting element 40.

Figure 5:
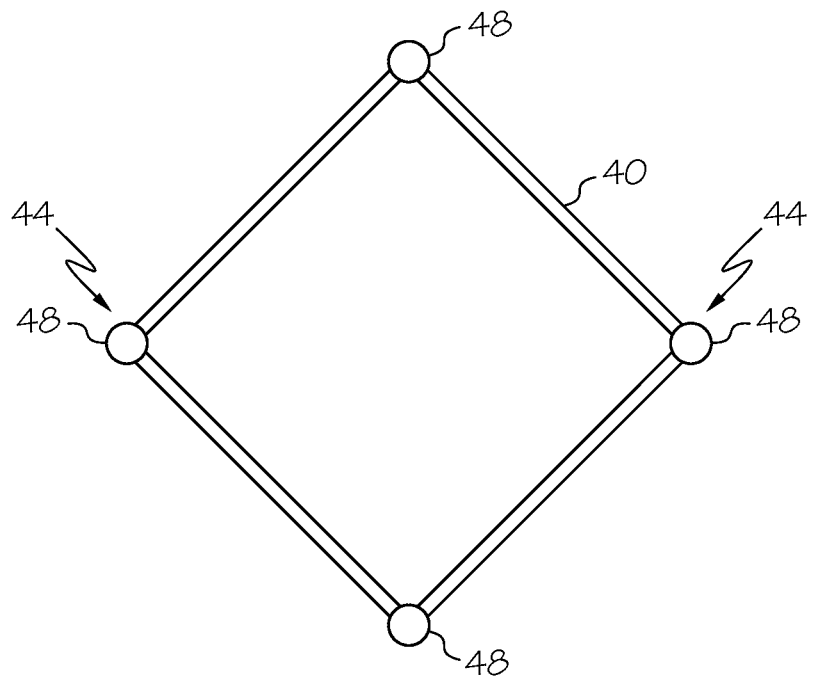
FIG. 5 is an elevational view of a deflecting element in accordance with one variation of the disclosure.

Referring to FIG. 5, in one optional variation, a hinge 48 may be incorporated into a deflecting element 40. While four hinges 48 are shown in FIG. 5—one at each node 44—fewer than four hinges or more than four hinges may be used without departing from the scope of the present disclosure.

Figure 6:
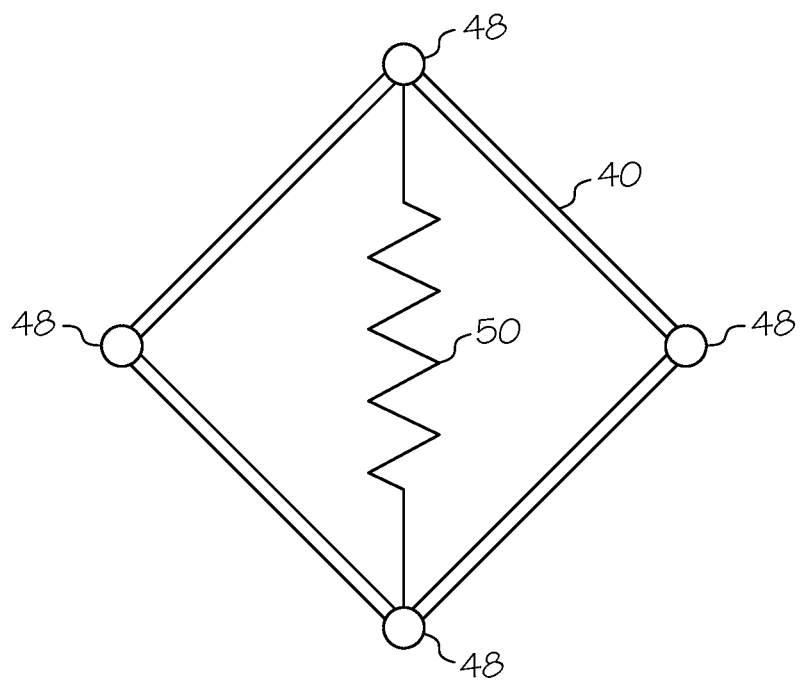
FIG. 6 is an elevational view of a deflecting element in accordance with another variation of the disclosure.

Referring to FIG. 6, in another optional variation, a biasing element 50 may be incorporated into a deflecting element 40. For example, a coil spring biasing element 50 may extend across one or more deflecting elements 40 in the array 42 to resist longitudinal compression (arrows C in FIG. 3B).

Referring back to FIGS. 1 and 2, the skin 34 of the nozzle 14 may be received over and may cover the frame 32, particularly the exterior portion of the frame 32. Therefore, the skin 34 may form an aerodynamic surface 52 over the frame 32, particularly over the exterior portion of the frame 32. Optionally, the skin 34 may extend into the interior of the nozzle 14 to cover the interior portion of the frame 32.

The skin 34 of the nozzle 14 may be capable of responding to the divergence and convergence of the frame 32, while maintaining the aerodynamic surface 52 over the frame 32. Skin selection may require consideration of operating conditions, such as whether the propulsion unit 12 is a ducted fan exhausting ambient temperature air or an engine exhausting hot combustion gases.

Various materials may be suitable for use as (or in) the skin 34. As one non-limiting example, the skin 34 may be (or may include) a stretchable material, such as a stretchable polymeric material. As another non-limiting example, the skin 34 may include a series of overlapping plates, strips, tiles or the like. The plates, strips, tiles, etc. may be formed from or may include a metal, a ceramic, a polymer, a composite or a combination thereof. Optionally, seals may be positioned between the overlapping plates, strips, tiles, etc.

Figure 7:
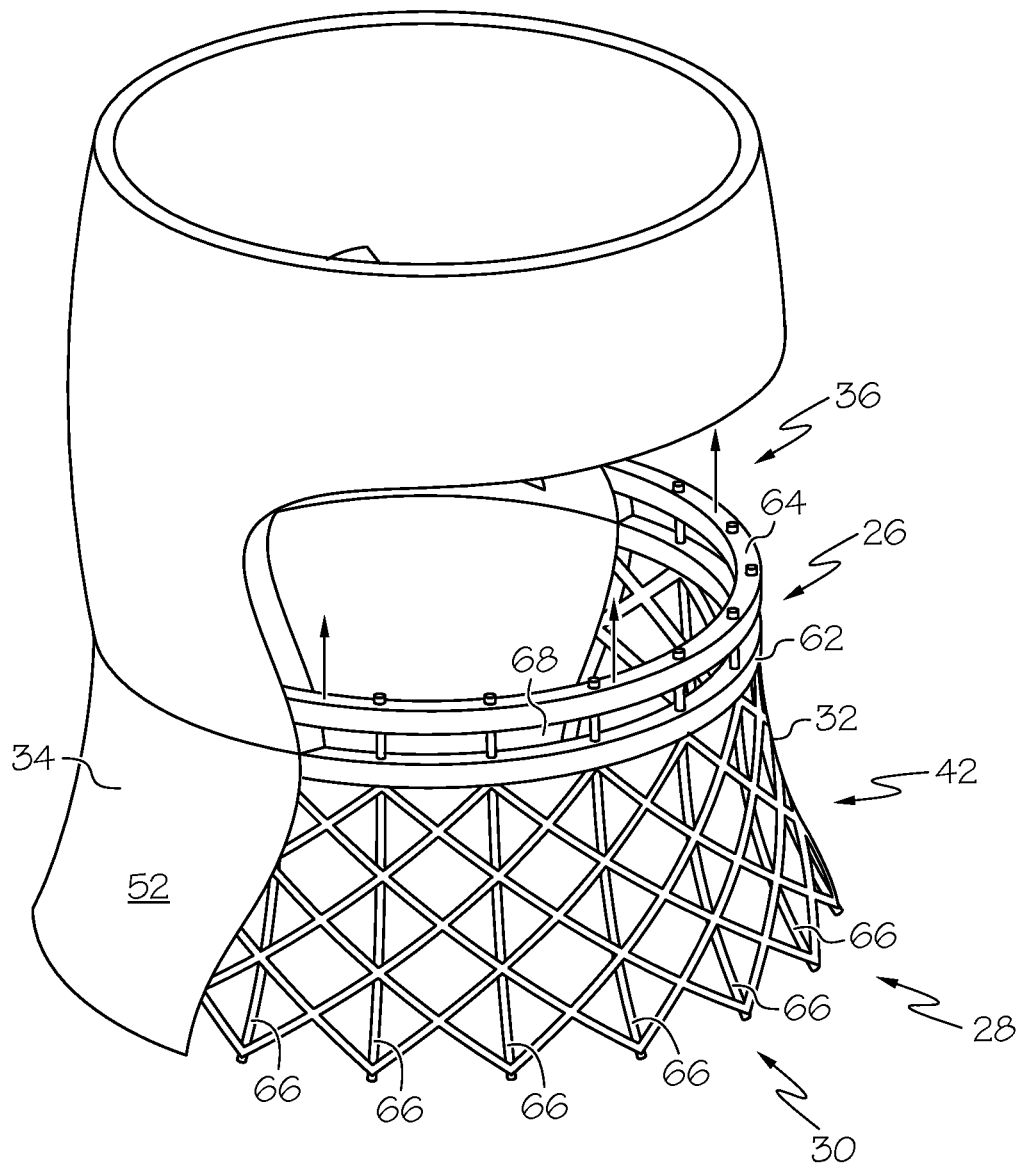
FIG. 7 is a cut-away perspective view of the propulsion system of FIG. 2 shown in an actuated (diverged) configuration.

Referring now to FIG. 7, the actuation assembly 36 of the nozzle 14 may be operatively connected to the frame 32 to supply the deflection force (e.g., the compression force C shown in FIG. 3B) required to effect lateral displacement (e.g., lateral expansion shown by arrow E in FIG. 3B) and a corresponding change in the cross-sectional area A of the throat 30 of the nozzle 14. The actuation assembly 36 may be any apparatus or system capable of supplying the deflection force to the frame 32 of the nozzle 14.

In one particular implementation, the actuation assembly 36 may include a stationary ring 62, a displaceable ring 64 and a plurality of connectors 66. The stationary ring 62 may be positioned proximate the inlet end 26 of the nozzle 14. The displaceable ring 64 may be displaceable relative to the stationary ring 62. For example, one or more actuators 68 (e.g., electric, hydraulic and/or pneumatic actuators) may be positioned (e.g., between the stationary ring 62 and the displaceable ring 64) to longitudinally displace (along longitudinal axis L in FIG. 2) the displaceable ring 64 relative to the stationary ring 62.

The connectors 66 may connect the displaceable ring 64 to the frame 32 of the nozzle 14. For example, the connectors 66 may be spaced (e.g., equidistantly spaced) about the circumference of the displaceable ring 64, and may extend from the displaceable ring 64 to the distal-most deflecting elements 40 in the array 42.

Thus, when the displaceable ring 64 is longitudinally displaced from the stationary ring 62, the connectors 66 may apply a deflection force to the frame 32, which causes corresponding lateral displacement of the frame 32. For example, when the displaceable ring 64 is longitudinally displaced from the stationary ring 62 toward the propulsion unit 12, the connectors 66 may apply a compression (deflection) force to the frame 32 that causes corresponding lateral expansion of the frame 32, which increases the cross-sectional area A of the throat 30 of the nozzle 14. Because the inlet end 26 of the frame 32 is fixed while the outlet end 28 expands, the nozzle 14 assumes a tapered, diverged configuration, as shown in FIG. 7. Alternatively, when the displaceable ring 64 is longitudinally displaced from the stationary ring 62 away from the propulsion unit 12, the connectors 66 may apply a pulling (deflection) force to the frame 32 that causes corresponding lateral contraction of the frame 32, which decreases the cross-sectional area A of the throat 30 of the nozzle 14. Because the inlet end 26 of the frame 32 is fixed while the outlet end 28 contracts, the nozzle 14 assumes a tapered, converged configuration.

Figure 8:
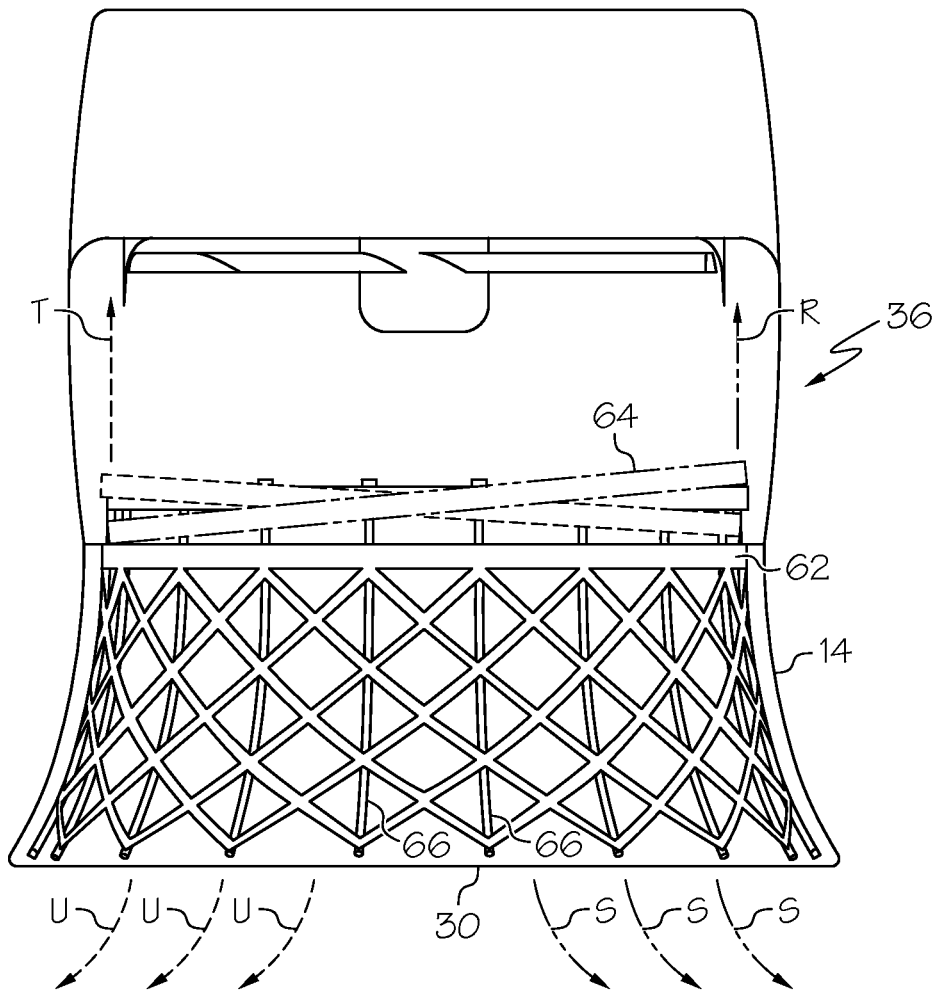
FIG. 8 is a cut-away elevational view of the propulsion system of FIG. 2 showing selective shaping of the nozzle.

Referring to FIG. 8, the actuation assembly 36 may facilitate thrust vectoring by non-symmetrically shaping the throat 30 of the nozzle 14. Specifically, thrust vectoring may be achieved by longitudinally displacing only a portion of the displaceable ring 64 relative to the stationary ring 62 and/or by non-uniformly longitudinally displacing the displaceable ring 64 relative to the stationary ring 62. For example, when the right side portion (shown in FIG. 8) of the displaceable ring 64 is displaced relative to the stationary ring 62, as shown by arrow R, the fluid exiting the throat 30 of the nozzle 14 may be directed in the direction shown by arrows S. When the left side portion (shown in FIG. 8) of the displaceable ring 64 is displaced relative to the stationary ring 62, as shown by arrow T, the fluid exiting the throat 30 of the nozzle 14 may be directed in the direction shown by arrows U.

Thus, the cross-sectional area A of the throat 30 of the nozzle 14, as well as the overall shape of the nozzle 14, may be controlled (e.g., in real time) by selectively applying deflection forces to the frame 32 of the nozzle 14.

Figure 9:
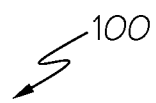
FIG. 9 is a flow chart illustrating one embodiment of the disclosed method for varying the cross-sectional area of the throat of a nozzle.

Also disclosed is a method for varying the cross-sectional area of the throat of a nozzle. Referring to FIG. 9, and with reference to FIG. 2, one embodiment of the disclosed method, generally designated 100, may begin at Block 102 with the step of providing a nozzle 14 having a frame 32 covered by a skin 34. The frame 32 may include a tubular array 42 of deflecting elements 40. The deflecting elements 40 may deflect in a direction substantially parallel with the longitudinal axis L to produce a displacement substantially perpendicular to the longitudinal axis L.

At Block 104, the nozzle 14 may be coupled to a propulsion unit 12. The propulsion unit 12 may include an inlet end 16 and an outlet end 18. In one implementation, the nozzle 14 may be connected to the propulsion unit 12 proximate the outlet end 18 of the propulsion unit 12 such that the nozzle 14 is substantially aligned with the propulsion unit 12 along a longitudinal axis L. In another implementation, the nozzle 14 may be connected to the propulsion unit 12 proximate the inlet end 18 of the propulsion unit 12 such that the nozzle 14 is substantially aligned with the propulsion unit 12 along a longitudinal axis L.

At Block 106, a deflection force may be applied to the frame 32 of the nozzle 14. The deflection force may be a substantially axial force (see longitudinal axis A), and may be applied as either a compression force (see arrows C in FIG. 3B) or a pulling force. The deflecting elements 40 of the frame 32 may respond to the deflection force by either laterally expanding or contracting, thereby causing corresponding divergence or convergence of the throat 30 of the nozzle 14.

Figure 10:
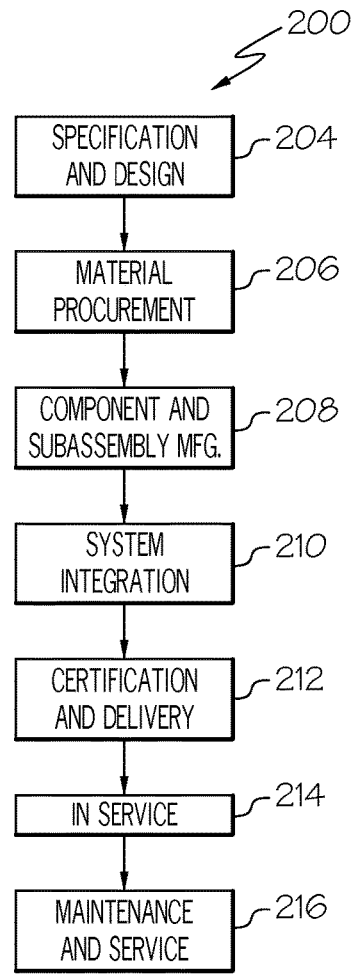
FIG. 10 is flow diagram of an aircraft manufacturing and service methodology.
Figure 11:
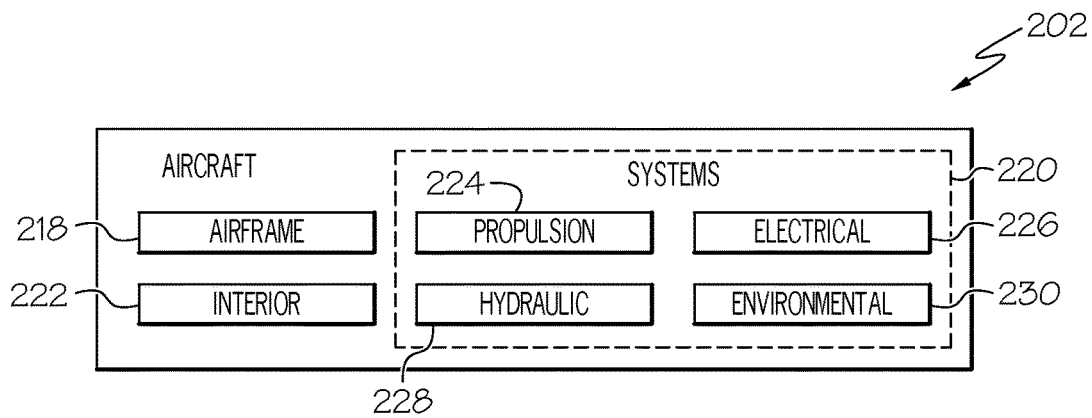
FIG. 11 is a block diagram of an aircraft.

Examples of the disclosure may be described in the context of an aircraft manufacturing and service method 200, as shown in FIG. 10, and an aircraft 202, as shown in FIG. 11. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

The disclosed nozzle 14 may be employed during any one or more of the stages of the aircraft manufacturing and service method 200. For example, components or subassemblies corresponding to component/subassembly manufacturing 208, system integration 210, and or maintenance and service 216 may be fabricated or manufactured using the disclosed nozzle 14. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of system examples, method examples, or a combination thereof may be utilized while the aircraft 202 is in service, for example and without limitation, to maintenance and service 216.

The disclosed system and method are described in the context of an aircraft; however, one of ordinary skill in the art will readily recognize that the disclosed service system may be utilized for a variety of different components for a variety of different types of vehicles. For example, implementations of the embodiments described herein may be implemented in any type of vehicle including, e.g., helicopters, passenger ships, automobiles and the like.

Although various embodiments of the disclosed variable area nozzle and associated propulsion system and method have been shown and described, modifications may occur to those skilled in the art upon reading the specification. The present application includes such modifications and is limited only by the scope of the claims.

What is claimed is:

1. A nozzle comprising:
    a frame comprising a plurality of deflecting elements arranged in an array, said array extending about a longitudinal axis, wherein at least a first of said plurality of deflecting elements is fixedly connected at a first node to an adjacent second of said plurality of deflecting elements and is fixedly connected at a second node to an adjacent third of said plurality of deflecting elements;
    a skin positioned over said frame; and
    actuation assembly operatively connected to said frame to supply a deflection force to said frame.

2. The nozzle of claim 1 wherein each deflecting element of said plurality of deflecting elements is fixedly connected at a node to adjacent deflecting elements of said plurality of deflecting elements.

3. The nozzle of claim 1 wherein each deflecting element of said plurality of deflecting elements produces a lateral displacement in response to a deflection force applied in a direction substantially parallel to said longitudinal axis.

4. The nozzle of claim 1 wherein each deflecting element of said plurality of deflecting elements comprises a rectilinear frame structure.

5. The nozzle of claim 1 wherein each deflecting element of said plurality of deflecting elements comprises a square frame structure.

6. The nozzle of claim 1 wherein each deflecting element of said plurality of deflecting elements comprises a curvilinear frame structure.

7. The nozzle of claim 1 wherein each deflecting element of said plurality of deflecting elements comprises a continuous frame structure.

8. The nozzle of claim 1 wherein at least one deflecting element of said plurality of deflecting elements comprises a hinge.

9. The nozzle of claim 1 wherein at least one deflecting element of said plurality of deflecting elements comprises a biasing element.

10. The nozzle of claim 1 wherein said skin comprises a stretchable material.

11. The nozzle of claim 1 wherein said skin comprises a plurality of plates, strips or tiles.

12. The nozzle of claim 1 wherein said actuation assembly supplies said deflection force in a direction substantially parallel with said longitudinal axis.

13. The nozzle of claim 1 wherein said actuation assembly comprises a displaceable ring and a plurality of connectors, wherein each connector of said plurality of connectors extends from said displaceable ring to an associated deflecting element of plurality of deflecting elements.

14. The nozzle of claim 13 wherein said actuation assembly further comprises a stationary ring, wherein said displaceable ring is displaceable relative to said stationary ring.

15. A propulsion system comprising:
    a propulsion unit having an inlet end opposed from an outlet end along a longitudinal axis; and
    a nozzle connected to said propulsion unit, wherein said nozzle defines a throat having a cross-sectional area, said nozzle comprising:
        a frame comprising a plurality of deflecting elements arranged in a tubular array, wherein at least a first of said plurality of deflecting elements is fixedly connected at a first node to an adjacent second of said plurality of deflecting elements and is fixedly connected at a second node to an adjacent third of said plurality of deflecting elements;

a skin positioned over said frame; and an actuation assembly operatively connected to said frame.

16. The propulsion system of claim 15 wherein said cross-sectional area changes in response to deflection force applied to said frame in a direction substantially parallel with said longitudinal axis.

17. The propulsion system of claim 15 wherein said nozzle is connected to said outlet end of said propulsion unit.

18. A nozzle method comprising:

providing a nozzle having a frame comprising a plurality of deflecting elements arranged in an array, said array extending about a longitudinal axis, wherein at least a first of said plurality of deflecting elements is fixedly connected at a first node to an adjacent second of said plurality of deflecting elements and is fixedly connected at a second node to an adjacent third of said plurality of deflecting elements; and applying a deflection force to said frame, wherein said deflection force is applied in a direction substantially parallel with said longitudinal axis.

19. The nozzle of claim 1 wherein said nozzle defines a throat having a cross-sectional area, and wherein said actuation assembly effects an expansion of the frame to increase the cross-sectional area of the throat and effects a contraction of the frame to decrease the cross-sectional area of the throat.

20. The propulsion system of claim 1 wherein said actuation assembly effects an expansion of the frame to increase the cross-sectional area of the throat and effects a contraction of the frame to decrease the cross-sectional area of the throat.

* * * * *